US012792701B1

(12) United States Patent
Antebi et al.

(10) Patent No.: US 12,792,701 B1
(45) Date of Patent: Nov. 10, 2026

(54) WATERMARKING OF TEXT GENERATED BY A LANGUAGE MODEL AND DETECTION THEREOF

(71) Applicant: Intuit Inc., Mountain View, CA (US)

(72) Inventors: Sagiv Antebi, Petah Tikva (IL); Matan Vetzler, Petah Tikva (IL); Ofir Ben Shoham, Petah Tikva (IL); Shai Ardazi, Petah Tikva (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/397,802

(22) Filed: Nov. 21, 2025

(51) Int. Cl.
*G06F 21/16* (2013.01)
*G06F 40/284* (2020.01)

(52) U.S. Cl.
CPC ............ *G06F 21/16* (2013.01); *G06F 40/284* (2020.01)

(58) Field of Classification Search
CPC ........ G06F 21/16; G06F 40/284; G06F 40/56; G06F 18/2321; G06N 3/0442; G06N 3/08; H04L 9/32
See application file for complete search history.

(56) References Cited

U.S. PATENT DOCUMENTS

2024/0320529 A1* 9/2024 Dathathri ............... G06N 3/045

OTHER PUBLICATIONS

Guo (Context-aware Watermark with Semantic Balanced Green-red Lists for Large Language Models, 2024) (Year: 2024).*
Dathathri, S., et al., "Scalable Watermarking for Identifying Large Language Model Outputs", Oct. 23, 2024, 14 pages.
Wu, J., et al., "A Survey on LLM-Generated Text Detection: Necessity, Methods, and Future Directions, Computational Linguistics", vol. 51, Issue 1, Apr. 19, 2024, 64 pages.

* cited by examiner

*Primary Examiner* — Brian F Shaw
(74) *Attorney, Agent, or Firm* — Lathrop GPM LLP

(57) ABSTRACT

A method including processing a language model to generate a number of tokens. The number of tokens includes a subset of tokens that are newly generated. The method also includes processing a clustering model on the subset of tokens to generate a semantic cluster. The semantic cluster includes a number of related tokens that are within a predetermined semantic distance of the subset of tokens. The method also includes generating a seed. The method also includes generating, from a combination of the seed and the semantic cluster, a watermarking data structure. The method also includes generating, by a sampling process using the watermarking data structure, a watermarked token after the number of tokens. The method also includes adding the watermarked token to the number of tokens to generate output tokens. The method also includes returning the output tokens.

20 Claims, 5 Drawing Sheets

WATERMARKING OF TEXT GENERATED BY A LANGUAGE MODEL AND DETECTION THEREOF

BACKGROUND

Language models are increasingly used to generate text, including entire essays, scientific papers, legal pleadings, works of fiction, etc. As used herein, text generated by a language model is referred to as ‘artificial intelligence text,” or “AI text.”

Intense interest has developed in determining whether a body of text is AI text or human-generated text. For example, a professor assigns an essay to the students in a class, and forbids the students from using AI text. The professor may want to determine whether a paper submitted by a student was AI text. In another example, a customer of a company may complain that AI text generated by the company wrongfully led the customer astray. In this case, the company may desire to prove whether the company's large language model generated the AI text and thus could be attributed to the company. Alternatively, the company may desire to check whether a scientific paper published by a third-party plagiarizes some AI text generated by the company.

Detecting AI text is technically difficult. Humans, for example, cannot reliably determine whether any given corpus of text is AI text or human-generated text. Wu et al. found that, “ . . . . Human-based detection methods are no better, achieving accuracy rates only slightly above random chance . . . ” Wu et al., A Survey on LLM-Generated Text Detection: Necessity, Methods, and Future Directions, Computational Linguistics, Vol. 51, Issue 1 (March 2025).

While some techniques for identifying AI text are known, such techniques are brittle. As used herein, ‘brittle’ means that changing a few words (in some cases as few as one word) to one or more synonyms of the original word(s) used in the original AI text, or adding or deleting a few terms or sentences to the original AI text, cause AI text detection tools to fail to detect the modified version of the AI text. As used herein, the term ‘modified AI text” refers to text that is based on an original work of AI text generated entirely by a language model, but where the original work of AI text has been modified in some way (whether modified by a human or modified by a language model).

Therefore, because Humans cannot reliably detect AI text, a purely technical problem exists. The technical problem is how to reliably detect modified AI text.

SUMMARY

One or more embodiments provide for a method. The method includes processing a language model to generate a number of tokens. The number of tokens includes a subset of tokens that are newly generated. The method also includes processing a clustering model on the subset of tokens to generate a semantic cluster. The semantic cluster includes a number of related tokens that are within a predetermined semantic distance of the subset of tokens. The method also includes generating a seed. The method also includes generating, from a combination of the seed and the semantic cluster, a watermarking data structure. The method also includes generating, by a sampling process using the watermarking data structure, a watermarked token after the number of tokens. The method also includes adding the watermarked token to the number of tokens to generate output tokens. The method also includes returning the output tokens.

One or more embodiments provide for a system. The system includes a computer processor and a data repository in communication with the computer processor. The data repository stores a number of tokens. The number of tokens includes a subset of tokens that are newly generated. The data repository also stores a semantic cluster. The semantic cluster includes a number of related tokens that are within a predetermined semantic distance of the subset of tokens. The data repository also stores a seed and a watermarking data structure. The data repository also stores a watermarked token and output tokens. The system also includes a language model executable by the computer processor to generate the number of tokens. The system also includes a clustering model executable by the computer processor to generate the semantic cluster. The system also includes a server controller executable by the computer processor to generate, from a combination of the seed and the semantic cluster, the watermarking data structure. The server controller is further executable by the computer processor to generate, by a sampling process using the watermarking data structure, the watermarked token after the number of tokens. The server controller is further executable by the computer processor to add the watermarked token to the number of tokens to generate the output tokens. The server controller is further executable by the computer processor to return the output tokens.

One or more embodiments provide for another method. The method includes processing a language model to generate a number of tokens, the number of tokens includes a subset of tokens that are newly generated. The method also includes processing a clustering model on the subset of tokens to generate a semantic cluster. The semantic cluster includes a number of related tokens within a predetermined semantic distance of the subset of tokens. The method also includes generating a seed from the semantic cluster. The method also includes generating, from a combination of the seed and the semantic cluster, a watermarking data structure. The watermarking data structure is associated with the semantic cluster. The method also includes generating, by a tournament sampling process using the watermarking data structure, a watermarked token after the number of tokens. The method also includes adding the watermarked token to the number of tokens to generate output tokens. The method also includes returning the output tokens. the output tokens include artificial intelligence (AI) text. The method also includes receiving modified AI text including the AI text after a token in the AI text has been modified, deleted, or added, and further including a cluster token, and wherein the cluster token includes the token that is present within the modified AI text and which belongs to the semantic cluster. The method also includes combining the modified AI text with the watermarking data structure to generate a score. The method also includes determining that the score exceeds a threshold value. The method also includes identifying, responsive to the score exceeding the threshold value, that the modified AI text includes a variation of the AI text.

Other aspects of one or more embodiments will be apparent from the following description and the appended claims.

BRIEF DESCRIPTION OF DRAWINGS

Like elements in the various figures are denoted by like reference numerals for consistency.

DETAILED DESCRIPTION

One or more embodiments are directed to improved watermarking of text generated by a language model and detection thereof. In particular, or more embodiments are directed to solutions to the technical problem of how to reliably detect modified AI text.

The process of watermarking AI text is now described, as the process of detecting modified AI text uses concepts involved in watermarking the original AI text as that original AI text is generated. Language models generate text token by token. As used herein, the term "token" refers to an alphanumeric term (e.g., text, number, symbols, etc.) and may be a letter, a word, a phrase, etc., depending on implementation. Each subsequent token generated by the language model represents the predicted next token in a series of tokens, until the language model predicts that the series of tokens is completed. The process of watermarking the resulting AI text, according to one or more embodiments, proceeds as follows.

One or more embodiments generate, for each token generated by a language model, a cluster of different terms that are semantically related to a given candidate token. For example, if the language model predicts that the next token in an output is the word "cat," then the system generates a cluster of terms that are related to the term "cat," such as "feline, kitty, etc. While the cluster of terms are not output by the system, the cluster of semantically related terms is stored. Practically, the language model generates multiple candidate words, such as "cat," "dog," etc., and for each such candidate word, a cluster of semantically related terms is generated. (Thus, for example, a first cluster includes tokens such as "cat, feline, kitty, etc." and a second cluster includes tokens such as "dog, canine, pooch, etc.")

Then, a seed is generated. The seed may be a hash (i.e., a combination) of a watermarking key and the clusters generated from most recent tokens generated by the language model in response to the prompt.

Next, one or more watermarking data structure(s) is generated from a combination of the seed and the semantic cluster(s). The watermarking data structure(s) are one or more matrices which assign scores to the clusters. Each cluster, again, is based on candidate tokens under consideration by the language model for the next token to be output by the language model. The watermarking data structure(s) also may be described as independent pseudorandom number functions that assign a score (e.g., 0 or 1) to the cluster(s).

Figure 4A:
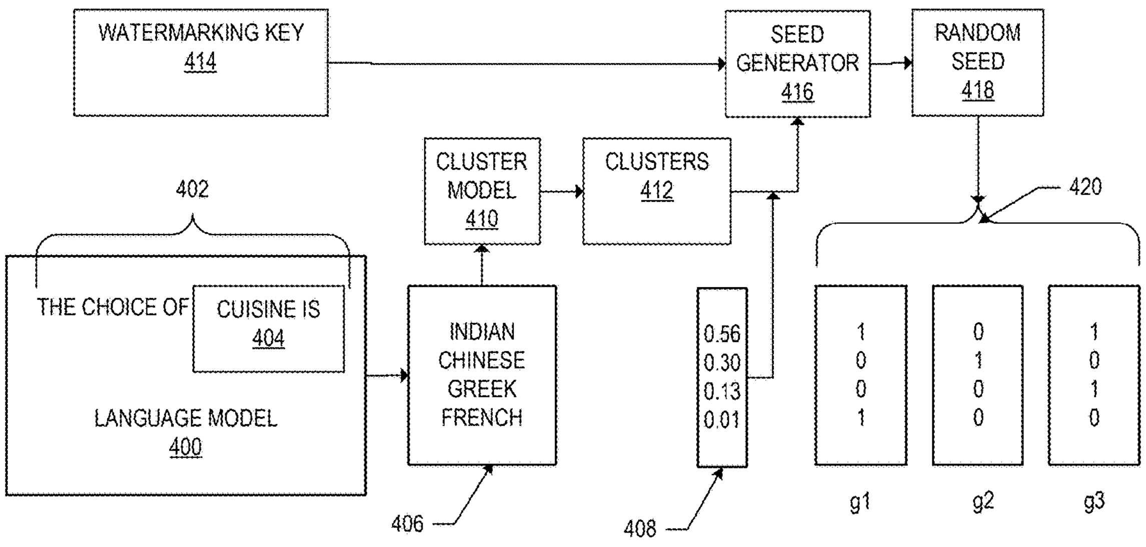
FIG. 4A and FIG. 4B show an example of the method for improved watermarking of text generated by a language model, as described in FIG. 2, in accordance with one or more embodiments.
Figure 4B:
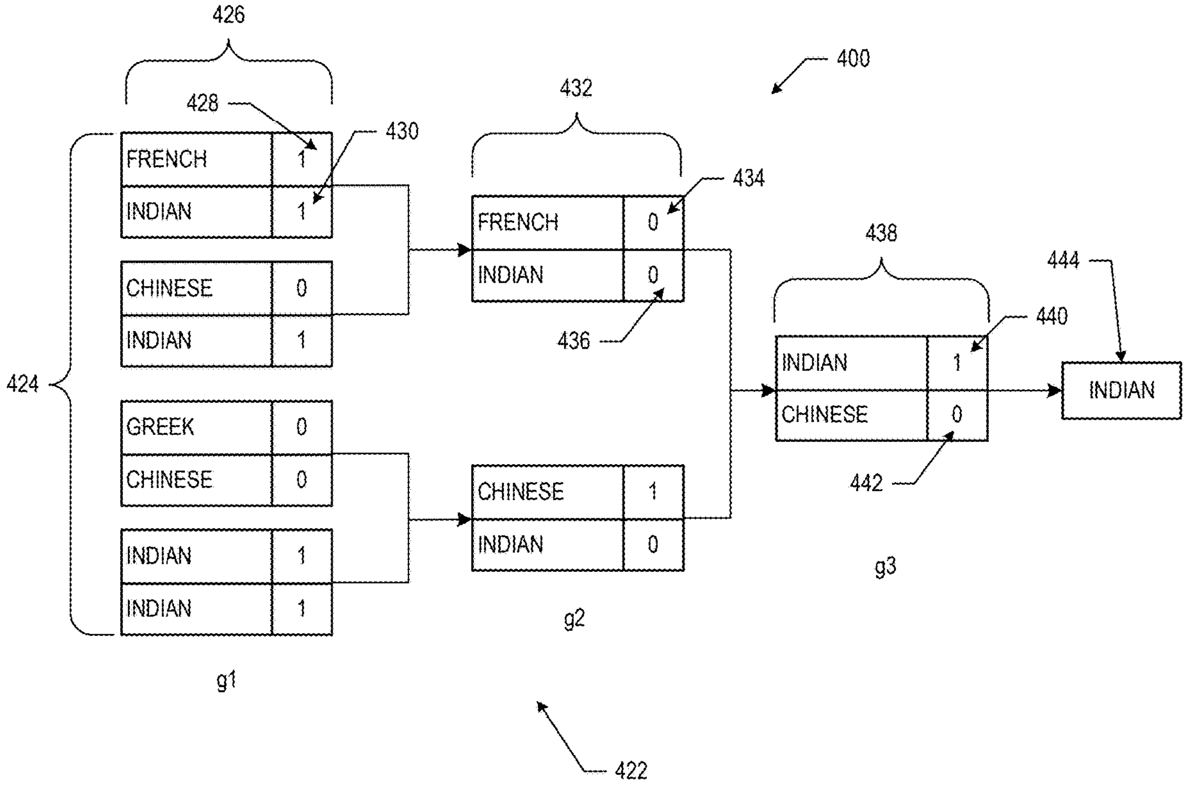

Then a watermarked token is generated by executing a sampling process that uses the watermarking data structure(s). The sampling process may be, for example, a tournament sampling process that forces different candidate tokens to be paired off against each other according to the values contained in the watermarking data structure(s). However, because the watermarking data structures are generated using the clusters, any tokens that share the same semantic cluster as a candidate token will receive the same values in the watermarking data structure(s). As explained later, this fact permits detection of modified AI text which varies the originally chosen candidate token with a semantically related token. An example of the sampling process is shown in FIG. 4A and FIG. 4B.

Thus, one or more embodiments are robust, not brittle, because the score generated by the function will not change, or will change insufficiently to thwart the test, if words in the original AI text are replaced by semantically equivalent words. In particular, because the watermarking functions are based on clusters of semantically terms, where each semantically similar term receives the same watermarking data structure value, the results of executing a watermark detection function on a given set of modified AI text will be the same (or sufficiently similar to prevent thwarting the test) whether or not the modified AI text was directly copied from original AI text or modified the original AI text using semantically similar terms.

As an example, assume a third-party wrongfully copies AI text generated by a language model of a company. Deceitfully, the third-party modifies the AI text, replacing many words with semantically similar terms so that the presented AI text is not an exact duplicate of the original AI text. The modified AI text therefore plagiarizes the original AI text.

The company, suspicious of plagiarism, decides to test the modified AI text. The company knows that all AI text generated on behalf of the company is subject to the watermarking process described above. Thus, the company executes the function described above on the modified AI text. Because the function is based on clusters of terms semantically related to the original AI text, the plagiarism is detected even though the original AI text was modified. Specifically, execution of the function results in a score that is above a threshold value, proving that the modified AI text is a modification of the original AI text. Thus, the company may take appropriate action in view of the plagiarism.

Figure 1:
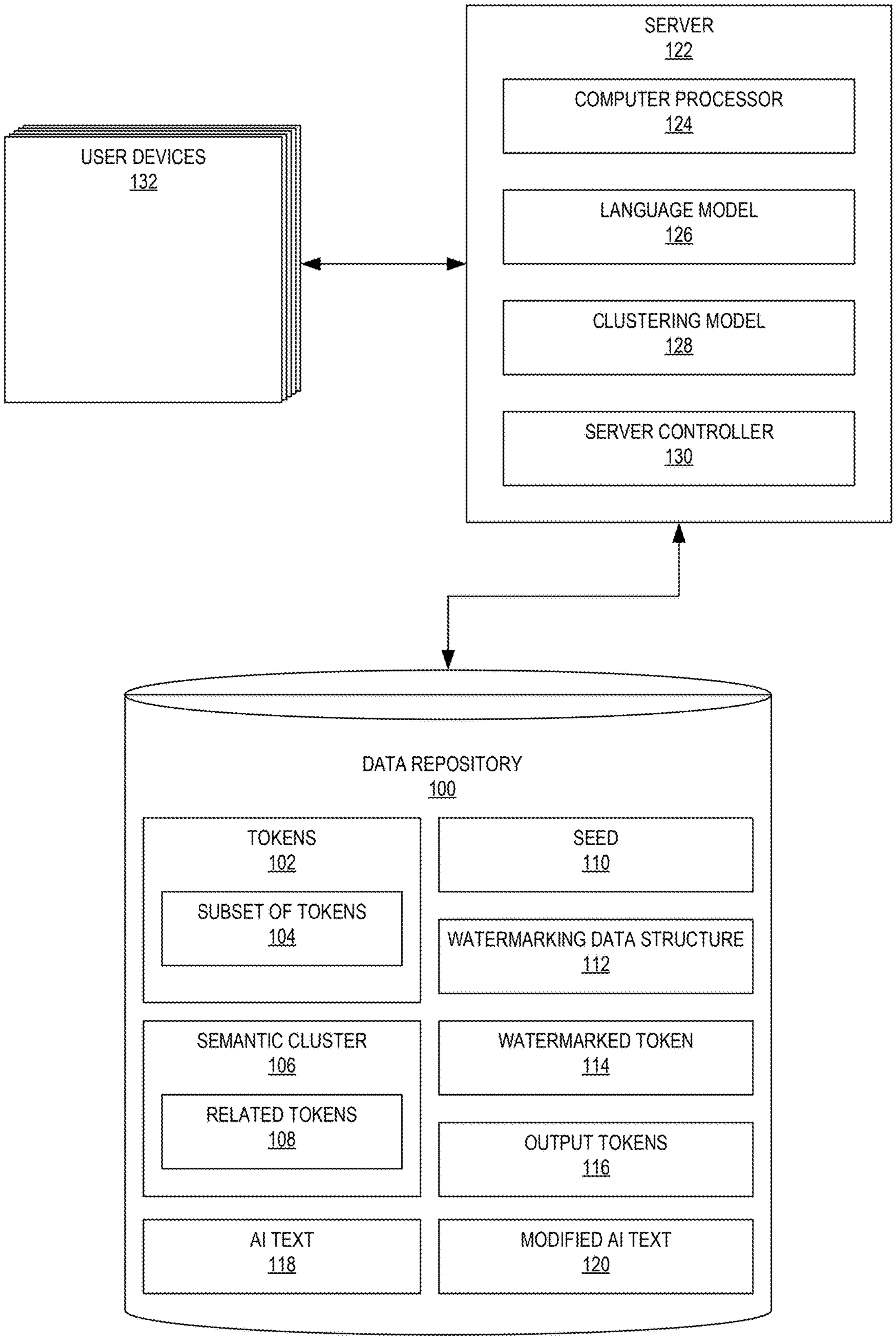
FIG. 1 shows a computing system for improved watermarking of text generated by a language model and detection thereof, in accordance with one or more embodiments.

Attention is now turned to the figures. FIG. 1 shows a computing system, in accordance with one or more embodiments. The system shown in FIG. 1 includes a data repository (100). The data repository (100) is a type of storage unit or device (e.g., a file system, database, data structure, or any other storage mechanism) for storing data. The data repository (100) may include multiple different, potentially heterogeneous, storage units and/or devices.

The tokens (102) are alphanumeric terms (e.g., text, number, symbols, etc.) and may be a letter, a word, a phrase, etc., depending on implementation. The language model (126), defined below, generates one token at a time.

The tokens (102) include a subset of tokens (104). The subset of tokens (104) are one or more tokens in a chain of tokens generated by the language model (126). In particular, the subset of tokens are one or more tokens that are most recently generated by the language model (126) (i.e., newly generated tokens). The subset of tokens (104) has fewer tokens than the total number of tokens (102) generated by the language model, except for the first token (or a first predetermined number of tokens) that the language model (126) generates. The first token (or first predetermined number of tokens) generated by the language model (126) is both the complete set of tokens (102) and the subset of tokens (104). However, after the first token (or the first predetermined number of tokens) is generated, the subset of tokens (104) will be the most recently generated token (or a second predetermined number of tokens) among the total set of the tokens (102) generated by the language model (126) at a given time.

The data repository (100) also stores a semantic cluster (106). The semantic cluster (106) is a cluster of tokens that are semantically related to one of the tokens (102) identified by the language model (126) as a candidate token to be output by the language model (126). The semantic cluster (106) is generated by the clustering model (128), as described with respect to FIG. 2. The candidate token may be the centroid of the cluster, and the remaining tokens within the semantic cluster (106) may be within a predetermined semantic distance (e.g., closely related) of the centroid candidate token. In an embodiment, the semantic cluster (106) may be multiple terms forming a phrase that is semantically related to a centroid phrase of multiple candidate tokens.

The semantic cluster (106) includes a number of related tokens (108). The related tokens (108) are the remaining tokens described above. In other words, the semantic cluster (106) may be the candidate token(s) (i.e., the subset of tokens (104)) plus a number of the related tokens (108) that are within a predetermined semantic distance of the subset of tokens (104).

The data repository (100) also stores a seed (110). The seed (110) is a random number that is used during the watermarking process described in FIG. 2. The seed may be a hash (i.e., a combination) of a watermarking key and the most recent tokens generated by the language model (126) in response to the prompt that commanded the language model (126) to generate text. However, the seed (110) may be generated by other random number generation methods, or pseudo-random number generation methods.

The data repository (100) also stores a watermarking data structure (112). The watermarking data structure (112) is a data structure that stores a series of numbers that represent a score assigned to each of a number of candidate tokens under consideration by the language model (126) during text generation. An example of the watermarking data structure (112) is shown in FIG. 4A and an example of the use of the watermarking data structure (112) is described with respect to FIG. 2 and FIG. 4B. The number of watermarking data structures (112) used during the method of one or more embodiments depends on the number of candidate tokens. In general, there may be N−1 watermarking data structures (112), where "N" is the number of candidate tokens, though more or fewer watermarking data structures (112) may be used for different sampling techniques used during the watermarking process described in FIG. 2, FIG. 4A, and FIG. 4B.

The data repository (100) also stores a watermarked token (114). The watermarked token (114) is a token selected as being the next token output by the language model (126), with that next token having been selected by the sampling process described with respect to FIG. 2, FIG. 4A, and FIG. 4B.

The watermarked token (114) is "watermarked" in the sense that the combination of the watermarked token (114) with previously generated watermarked tokens may be checked at a later time for being the AI text generated by the language model. Being "watermarked" does not mean that the watermarked token (114) is associated with metadata or is otherwise flagged by itself as having been AI generated. Thus, neither the text that the language model (126) outputs, nor metadata related to the text that the language model (126) outputs, indicates that a watermarked token (114) is different or "marked" in the sense that a physical piece of paper or an electronic document may be "watermarked."

Rather, to detect whether a sequence of tokens was generated by the language model, a test may be performed that measures how highly a given sequence of text scores with respect to the watermarking data structures. Specifically, a function may be used to generate a score. The function is defined in terms of the watermarking data structures, the watermarked token (114), and the random key. The function is described with respect to FIG. 4A and FIG. 4B. If the score generated by the function exceeds a threshold value, then the text that is under test is the AI text that the language model generated. In other words, the set of text that the language model (126) generates, as a whole, may be traced back to the language model (126) because the watermarking data structures (112) and the random key may be used to check the historic generation of the text when that text was originally generated by the language model (126).

The data repository (100) also stores a number of output tokens (116). The output tokens (116) represents the set of watermarked tokens that the language model (126) generates. In other words, the output tokens (116) is the completed output of the language model (126).

The data repository (100) also stores AI text (118). The AI text (118) is alphanumeric text generated by the language model (126), and thus is the output tokens (116). As used herein, the term "AI text" refers to original text that the language model (126) originally generates (i.e., the AI text (118) has not been modified after the language model (126) generated the AI text (118)). Thus, the terms "output tokens (116)" and "AI text (118)" are synonymous, as used herein.

The data repository (100) also stores modified AI text (120). The modified AI text (120) is the AI text (118) after modification. In other words, in the modified AI text (120), one or more tokens of the AI text (118) has been added, deleted, or replaced with a related term. Whereas prior methods of watermarking tokens could not determine whether the modified AI text (120) was generated by the language model (126), one or more embodiments described with respect to FIG. 2, FIG. 3, FIG. 4A, and FIG. 4B may be used to identify whether the modified AI text (120) is a modified version of the AI text (118). In other words, one or more embodiments may determine whether the modified AI text (120) is a modification of original text generated by the language model (126).

The system shown in FIG. 1 may include other components. For example, the system shown in FIG. 1 also may include a server (122). The server (122) is one or more computer processors, data repositories, communication devices, and supporting hardware and software. The server (122) may be in a distributed computing environment. The server (122) is configured to execute one or more applications, such as the language model (122), the clustering model (124), and the server controller (126). An example of a computer system and network that may form the server (122) is described with respect to FIG. 5A and FIG. 5B.

The server (122) includes a computer processor (124). The computer processor (124) is one or more hardware or virtual processors which may execute computer readable program code that defines one or more applications, such as the language model (122), the clustering model (124), and the server controller (126). An example of the computer processor (124) is described with respect to the computer processor(s) (502) of FIG. 5A.

The server (122) hosts a language model (126). The language model (126) is a natural language processing machine learning model. An example of the language model (126) may be a large language model, such as CHATGPT®. However, different language models may be used. Use of the language model (126) is described with respect to FIG. 2.

The server (122) also may host a clustering model (128). The clustering model (128) is a machine learning model that generates the semantic cluster (106) based on one or more of the tokens (102). The clustering model (128) may be, for example, WordNet (a lexical database where nouns, verbs, adjectives, and adverbs are grouped into sets of cognitive synonyms, each expressing a distinct concept) and software for generating semantically related terms from the WordNet based on candidate tokens generated by the language model (126). The clustering model (128) also may be a pretrained embedding model that converts candidate tokens into a vector data structure, and clustering model that uses the vector data structure to generate the semantic cluster (106). The embedding model may be, for example, a bidirectional encoder representations from transformers (BERT) model, a sentence BERT (SBERT) model, or a global vectors for word representation (GLoVe) model. The clustering model may be, for example, a k-medoids model (where the medoids are the candidate tokens), a k-means model (where the centroids are the candidate token), or some other clustering model.

The server (122) also may host a server controller (130). The server controller (130) is software or application specific hardware which, when executed by the computer processor (124), controls and coordinates operation of the software or application specific hardware described herein. Thus, the server controller (130) may control and coordinate execution of the language model (122) and the clustering model (124).

The system shown in FIG. 1 also may include one or more user devices (132). The user devices (132) are computing systems (e.g., the computing system (500) shown in FIG. 5A) that communicate with the server (122).

The user devices (132) may be considered remote or local. A remote user device is a device operated by a third-party (e.g., an end user of a chatbot) that does not control or operate the system of FIG. 1. Similarly, the organization that controls the other elements of the system of FIG. 1 may not control or operate the remote user device. Thus, a remote user device may not be considered part of the system of FIG. 1.

In contrast, a local user device is a device operated under the control of the organization that controls the other components of the system of FIG. 1. Thus, a local user device may be considered part of the system of FIG. 1.

While FIG. 1 shows a configuration of components, other configurations may be used without departing from the scope of one or more embodiments. For example, various components may be combined to create a single component. As another example, the functionality performed by a single component may be performed by two or more components.

Figure 2:
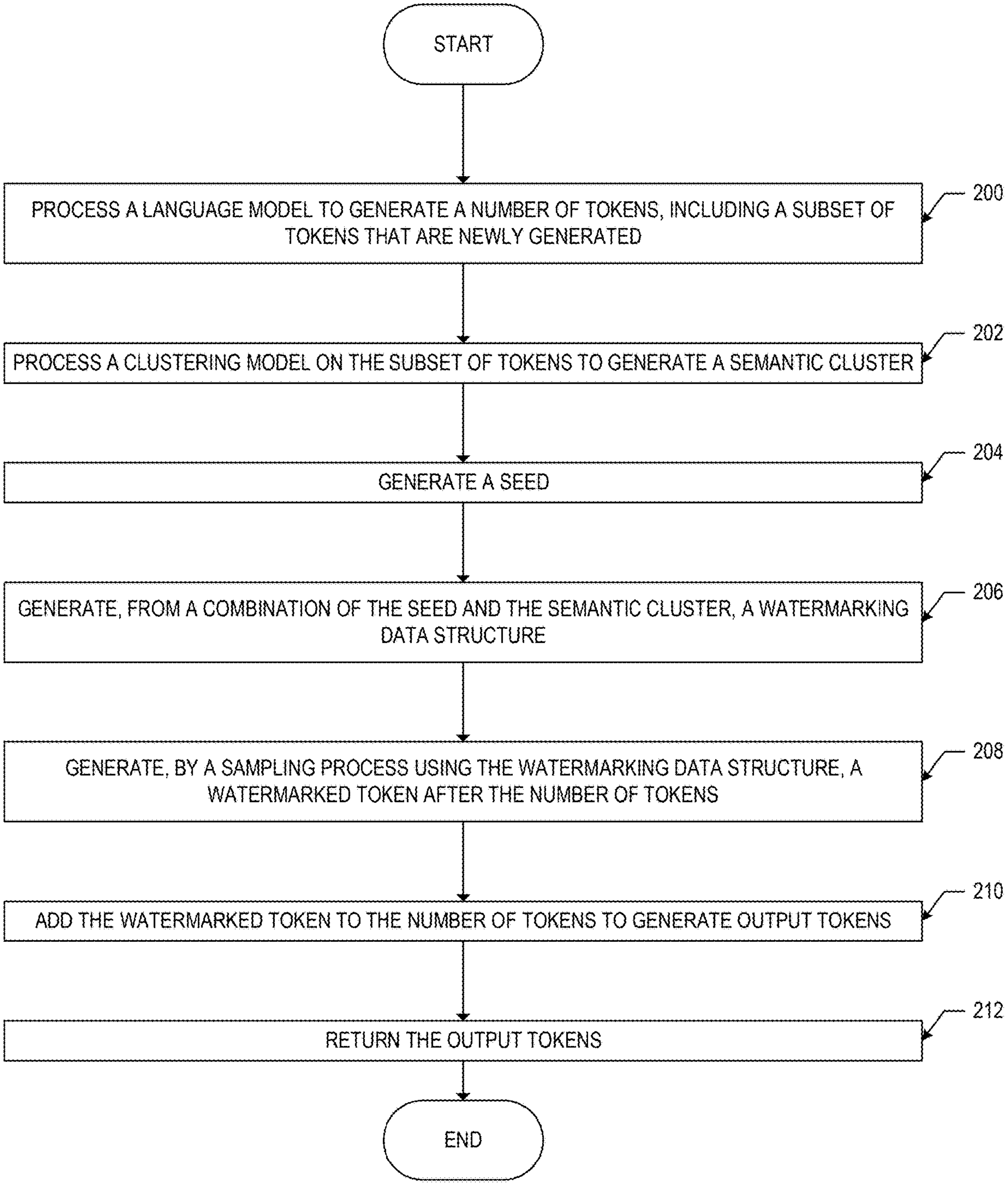
FIG. 2 shows a flowchart of a method for improved watermarking of text generated by a language model and detection thereof, in accordance with one or more embodiments.

FIG. 2 shows a flowchart of a method for improved watermarking of text generated by a language model and detection thereof, in accordance with one or more embodiments. The method of FIG. 2 may be implemented using the system of FIG. 1 and one or more of the steps may be performed on or received at one or more computer processors.

Step 200 includes processing a language model to generate a number of tokens. The number of tokens includes a subset of tokens that are newly generated. For example, the language model may generate the following tokens "Little Miss Muffet sat on a tuffet." The phrase in quotations may be the number of tokens. The words "sat on a tuffet" may be the subset of tokens that were most recently generated (as the language model predicts each new token in sequence, one at a time, considering a number of candidate tokens before picking a selected candidate token as the next token). The language model predicts tokens by processing a neural network on an input prompt.

When executed, the last layer of the neural network outputs each new token until the language model reaches a stop condition. The stop condition may be a prediction, made by the language model, that no further tokens should be generated as the total number of tokens generated satisfies the prompt. The stop condition also may be a maximum number of tokens generated, or some other stop condition.

Step 202 includes processing a clustering model on the subset of tokens to generate a semantic cluster. The clustering model may generate words within a predetermined semantic distance of one or more tokens in the subset of tokens. The generation may be performed by comparing the one or more tokens (i.e., the candidate tokens) to a semantic ontology (e.g., WordNet). The clustering model may selecting words in the semantic ontology that are within a predetermined semantic distance. Alternatively, another language model may be used to generate synonyms or terms that are related to the one or more tokens. Still further, a clustering model may be used to cluster groups of tokens in a token library together, using the one or more tokens as a centroid of the cluster. Other techniques also may be used to generate the cluster.

Step 204 includes generating a seed. The seed may be determined as follows. First, the subset of tokens (i.e., one or more mostly recently generated tokens) is identified. Then, the subset of tokens is combined with a watermarking key. Thus, for example, a group of tokens may be combined, as a phrase, with the watermarking key. The combination may be, for example, a hash of the watermarking key and the subset of tokens, as expressed in a vector data structure that represents the tokens as numbers. In turn, the watermarking key may be a randomly generated or pseudo randomly generated number.

Generation of the seed may be expressed as follows:

$$\text{r\_t} = h(\text{c\_}\{t-H:t-1\}, k), \tag{1}$$

where "r_t" represents the random seed, "h" represents a hash function. The term "c_{t–H: t–1}" represents the subset of tokens between the immediately prior token, "t–1," and the "Hth" token, "t–H" prior to the immediately prior token. The term "k" is the watermarking key.

Step 206 includes generating, from a combination of the seed and the semantic cluster, a watermarking data structure. The watermarking data structure may be generated by using an independent random or pseudo random number function to assign a score, "g" to each of the candidate tokens that the language model is currently considering to output as a next token. Each watermarking data structure includes one entry for each candidate token. The value of each entry in a given watermarking data structure is either zero or one, determined randomly or pseudo randomly. The probability that a given entry is 0 or 1 may be weighted based on the probability that the corresponding token will be predicted as the next token. For example, if the language model predicts that the word "mango" is 50% likely to be the next token, and the word "apple" is 20% likely to be the next token, then the value in the watermarking data structure representing the token "mango" may be proportionally more likely to be "1" than the word "apple."

The generation of watermarking data structures may be formalized as follows. For each tournament layer, "1," compute a watermarking data structure as follows:

$$g\_l = (c\_t, r\_t) = F\_k(h\_k(c\_t, l, r\_t)), \quad (2)$$

where the term "g_1" is the "1th" watermarking data structure and the term "c_t" is the tth cluster, "r_t" is the random seed defined above in equation 1. The term "F_k" is the is the inverse cumulative distribution function (CDF) (also known as the inverse transform sampling function) corresponding to the chosen g-value distribution (e.g., Bernoulli (0.5) or Uniform [0, 1]). The term "F_k" maps a uniformly random number from the hash output into a pseudorandom value drawn from that target distribution. The term "h_k" is the pseudorandom hash function (or pseudorandom function family) parameterized by the watermarking key k. The term "h_k" deterministically combines the semantic cluster ID c_t, the layer index 1, and the random seed r_t to produce a uniformly distributed integer used as the basis for g_1. Formally, "h_k" acts as the pseudorandom function that converts the structured inputs into the random number domain before transformation by F_k.

Thus, tokens that share the same semantic cluster, "c_t" will receive the same value in the watermarking data structure as the original candidate token. For example, if the original candidate token was assigned a value of "1" in a given watermarking data structure, then any semantically related word within the same cluster as the original candidate token will also have a value of "1." Accordingly, any semantically related token will be effectively watermarked, making modification of original AI text into undetectable modified AI text extremely difficult without changing the meaning of the original AI text. Accordingly, one or more embodiments provide a technical solution to the technical problem described above.

In one or more embodiments, generating "a watermarking data structure" generates multiple watermarking data structures. The number of watermarking data structures generated may be a predetermined number, represented by the variable, "m." Thus, if m=3, then there will be 3 watermarking data structures. The number of watermarking data structures is selected according to a sampling process described in step 208, below. However, in a practical application, the value of "m" may be 10 or higher.

Step 208 includes generating, by a sampling process using the watermarking data structure, a watermarked token after the number of tokens. The sampling process may be a tournament sampling process.

In the tournament sampling process, a sample of 2 m tokens is selected from the list of candidate tokens that the language model is considering outputting. Thus, if m=3 (i.e., there are 3 watermarking data structures), then there will be 8 tokens selected from the list of candidate tokens. Repeated tokens are possible. The 8 tokens are paired against each other. Each of the selected tokens in the first tournament round is assigned a value as determined by the first watermarking data structure for each selected token. The winning token of each pair is the token with the highest value in the first watermarking data structure (i.e., "1" beats "0.") If the values equal (i.e., both tokens in the pair have a watermarking data structure value of 1 or both tokens in the pair have a watermarking data structure value of 0), then a random token is determined to win. Because there were 4 pairs of tokens compared to each other, 4 out of the 8 tokens will proceed to round 2. The process then repeats, but this time using the second watermarking data structure. The winning 2 tokens of round 2 are paired against each other in a third round, this time using the third watermarking data structure.

The final winning token of the tournament is the candidate token that is returned as the next token in the sequence of tokens. The returned token is the "watermarked token" in step 208. The process described above is shown in example form in FIG. 4B.

In another example, if m=10, then 10 watermarking data structures are generated. The tournament then includes 210=1024 selected candidate tokens, resulting in 512 pairs of tokens in round 1, and the tournament proceeds as described above in 10 rounds using each watermarking data structure in sequence. The value of m may be 30 or higher in some cases (i.e., 1,073,741,824) candidate tokens, resulting in 536,870,912 pairs of tokens in round 1, and the tournament proceeds as described above in 30 rounds using each watermarking data structure in sequence. Again, because candidate tokens can be selected multiple times, even the four candidate tokens shown in FIG. 4A can be randomly selected to generate more than a billion instances (i.e., 1030) of the four candidate tokens (i.e., each of the billion tokens is one of the four candidate tokens).

Other sampling methods may be used. Thus, one or more embodiments are not necessarily limited to the tournament method described above. However, whatever sampling method is used, the output of sampling is the watermarked token which the language model returns as the next token in the sequence of tokens.

Step 210 includes adding the watermarked token to the number of tokens to generate output tokens. As indicated above, language models predict each token in sequence. Thus, the watermarked token is added to the previously generated tokens on a token-by-token basis, starting with the first token that the language model outputs.

Step 212 includes returning the output tokens. Returning the output tokens may include displaying the output tokens, possibly as they are generated on a token-by-token basis. Returning the output tokens also may include storing the output tokens, providing the output tokens to some other computing process, transmitting the output tokens via a communication link, etc.

The method of FIG. 2 repeats each time the language model generates a new token. Thus, the method of FIG. 2 outputs a sequence of watermarked tokens that, taken together as a whole, form the ultimate output of the language model once the language model determines that a stop condition has been met.

The method of FIG. 2 may be varied. For example, the method may be extended to include detection of the set of watermarked tokens. In the example, the set of output tokens may be referred to as AI text. In this case, the method also may include, after step 212, receiving modified AI text including the AI text after a token in the AI text has been modified, deleted, or added.

Next, the modified AI text may be combined with the watermarking data structure to generate a score. The score may be generated as follows:

$$x = \frac{1}{mT}\sum_{t=1}^{T}\sum_{l=1}^{m} g_l(x_t, r_t), \tag{3}$$

where “x” is the score. The value of “m” is as defined above (i.e., the number of watermarking data structures). The value of “T” is the total number of tokens. The value of “t” is an index representing a particular token in the set of “T” tokens. The value of “g” represents a watermarking data structure. The value of “1” is an index representing a particular watermarking data structure in the set of “g” watermarking data structures. The value of “r” is the random seed described above.

Note that because the watermarking data structures, g, are based on clusters of tokens, rather than on individual tokens (as described with respect to step 206), the resulting test automatically accounts for variations in the original AI text, so long as the same or similar overall semantic meaning is present in the modified AI text. The reason is that, taking the watermarked tokens as a whole, statistically speaking, combining the watermarking data structures, the random seed, and the modified text tokens will reflect the overall semantic meaning of the original text. Accordingly, the method described above can detect modified AI text, whereas sampling techniques that only rely on token-by-token measurement are brittle and can only detect near exact matches between the modified AI text and the original AI text. Hence, one or more embodiments described in FIG. 2 solve the technical problem described above.

After generating the score, a determination is made whether the score exceeds a threshold value. The threshold value may be predetermined by a computer scientist or a software process.

The method then includes identifying, responsive to the score exceeding the threshold value, that the modified AI text includes a variation of the AI text (i.e., the modified AI text is a plagiarized version of the original AI text). If the score does not exceed the threshold value, then the AI text under test is judged to be not a version of the original AI text.

In another embodiment, the modified AI text includes a cluster token. The cluster token includes the token that is present within the modified AI text and which belongs to the semantic cluster. Thus, the watermarking data structure may be described as being associated with the semantic cluster. More specifically, as described with respect to step 206, above, any token within the same semantic cluster as a candidate token will receive the same value within any given watermarking data structure, which is how the watermarking data structure is described as being associated with the semantic cluster.

Other variations are possible. For example, the seed may be generated from the semantic cluster. In other words, instead of generating the seed from the candidate token, the cluster may be generated first and the seed then generated from the semantic cluster in a manner similar to that described with respect to step 204. In still another variation, the seed may be generated from a most recent set of the number of the semantic clusters.

In still another variation, wherein the number of tokens includes a number of subsets of tokens, in addition to the subset of tokens. In this case, the method also includes processing the clustering model on the number of subsets of tokens to generate a number of semantic clusters. The number of semantic clusters each includes an additional number of related tokens that are within a corresponding predetermined semantic distance of the number of subsets of tokens within a cluster in the number of semantic clusters. In other words, the semantic clusters include tokens that are within a predetermined semantic distance of a centroid token (which, in turn, is the candidate token originally under consideration by the language model to be added to the list of output tokens).

Continuing the variation, the method then includes generating, from a combination of the seed and the number of semantic clusters, a corresponding number of watermarking data structures for each of the number of semantic clusters. Then, the method includes generating, by the sampling process, a number of additional watermarked tokens after the number of tokens and after the watermarked token. Then, the method also includes adding the number of additional watermarked tokens to the number of tokens to generate new output tokens. Then, the method also includes returning the new output tokens. In other words, in this variation, the method of FIG. 2 may be repeated to add new output tokens until the language model predicts that the stop condition has been satisfied, and so no further tokens will be generated.

In the above method, the new output tokens include new artificial intelligence (AI) text. In this case, the method also may include receiving new modified AI text including the new AI text after a token in the new AI text has been modified, deleted, or added. Then, the method includes combining the new modified AI text with the corresponding number of watermarking data structures to generate a modified score. Then, the method includes determining that the modified score exceeds a threshold value. Then, the method includes identifying, responsive to the modified score exceeding the threshold value, the new modified AI text includes a second variation of the AI text. In other words, the entire sequence of tokens may be checked for plagiarism.

In the above method, each of the corresponding number of watermarking data structures may be associated with a corresponding number of potential next tokens. In this case, the language model generates a different set of corresponding potential next tokens for each of the number of tokens. In other words, the potential next tokens (i.e., the candidate) tokens may be a list of tokens (e.g., 4 tokens), of which one will be selected as the next token. Each of the number of tokens may be selected from a corresponding one of the different set of corresponding potential next tokens.

While the various steps in the flowchart of FIG. 2 are presented and described sequentially, at least some of the steps may be executed in different orders, may be combined or omitted, and at least some of the steps may be executed in parallel. Furthermore, the steps may be performed actively or passively.

Figure 3:
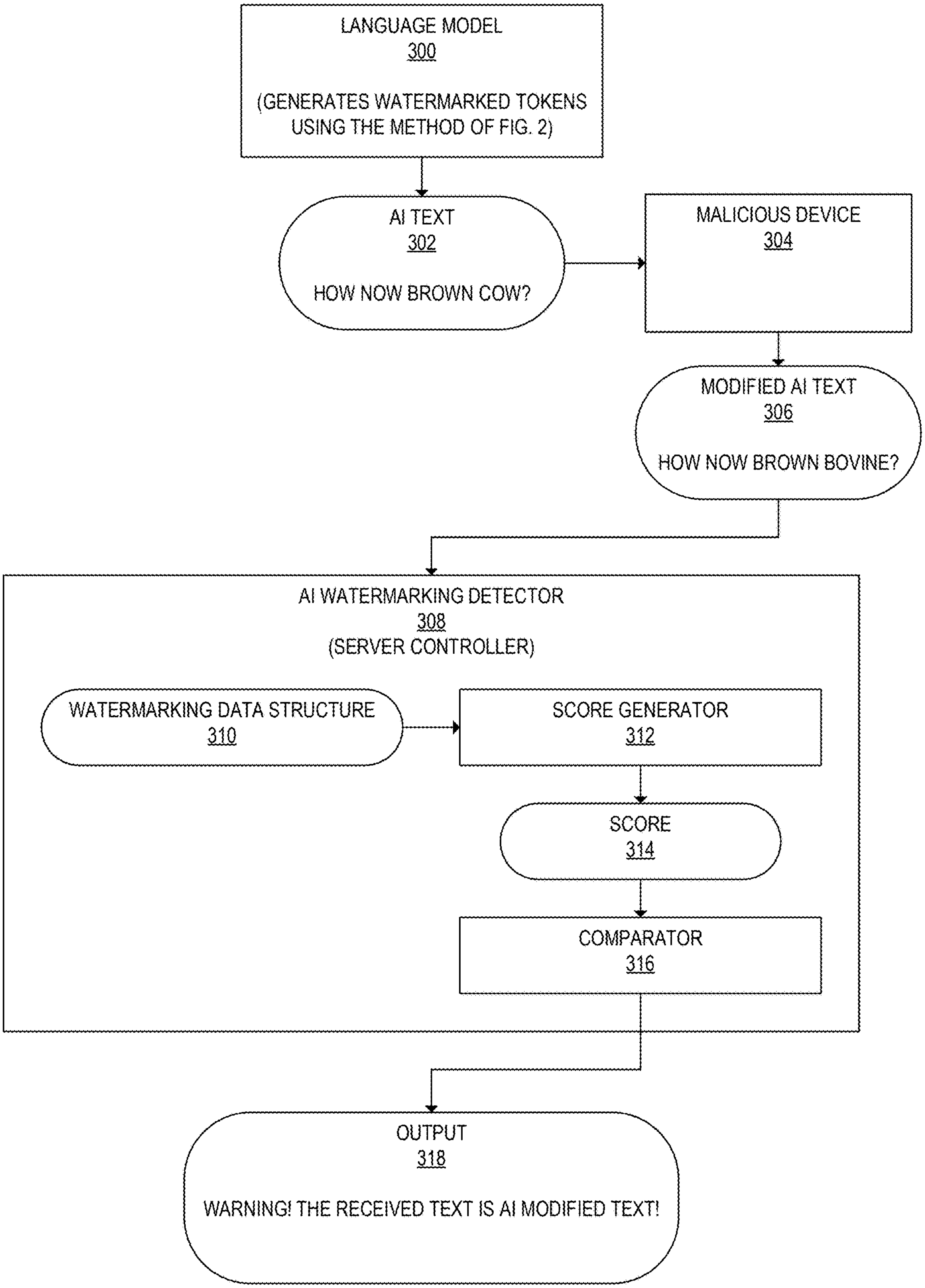
FIG. 3 shows an example of a dataflow for improved watermarking of text generated by a language model and detection thereof, in accordance with one or more embodiments.

FIG. 3 shows an example of a dataflow for improved watermarking of text generated by a language model and detection thereof, in accordance with one or more embodiments. The dataflow may be performed using the system of FIG. 1. Several steps described with respect to FIG. 3 may be performed as described with respect to FIG. 2. The following example is for explanatory purposes only and not intended to limit the scope of one or more embodiments.

In the dataflow of FIG. 3, a language model (300) generates a number of watermarked tokens using the method of FIG. 2. The watermarked tokens is AI text (302). In the example, the output is “how now brown cow?,” which is the original AI text (302).

Next, a malicious device (304) (i.e., a operated by a malicious third-party user) generates modified AI text (306). In the example, the modified AI text (306) is "how now brown bovine?" The malicious users seeks to pass the modified AI text (306) as the malicious user's own work.

The company that owns the language model (300) is suspicious of the modified AI text (306). Thus, the company passes the modified AI text (306) to a AI watermarking detector (308) (which may be the server controller (130) of FIG. 1). The watermarking data structure (310), the seed, and the modified AI text (306) are combined using a score generator (312). The score generator (312) performs the watermarking detection procedure as described above with respect to FIG. 2.

The output of the score generator (312) is a score (314), again as described with respect to FIG. 2. The score (314) is passed to a comparator (316) (which again may be the server controller (130) of FIG. 1), which compares the score (314) to a threshold value.

In the example, the comparator (316) determines that the score (314) satisfies the threshold value. Thus, the comparator (316) outputs a output (318), which in the example is the text, "Warning! The received text is AI modified text!" In other words, the modified AI text (306) is a plagiarized version of the AI text (302).

FIG. 4A and FIG. 4B show an example of the method for improved watermarking of text generated by a language model, as described in FIG. 2, in accordance with one or more embodiments. FIG. 4A and FIG. 4B, taken together, show an example of a watermarking algorithm, which is described in in FIG. 2 with respect to step 200 through step 208.

FIG. 4A shows an example of step 200 through step 206 of FIG. 2. As mentioned above, step 200 is to process a language model (400) to generate a number of tokens (402), including a subset of tokens (404) that are newly generated by the language model (400). In the example, the number of tokens (402) is "the choice of cuisine is." The subset of tokens (404) is the most recently generated two tokens, i.e., "cuisine is." Note that the subset of tokens could be one, three, or more tokens in other embodiments.

The language model (400) is in the process of predicting the next token in the chain of tokens. The next token eventually will be added to the number of tokens (402). The language model (400) is considering four candidate tokens (406). The candidate tokens (406) are "Indian," "Chinese," "Greek," and "French." In other words, if the language model predicts the next token is "Greek," then the phrase would read "the choice of cuisine is Greek."

The language model (400) predicts a number of probabilities (408). Each probability reflects a probability that the language model (400) will select the corresponding candidate token in the candidate tokens (406). Thus, for example, the candidate tokens (406) is 56% likely to choose "Indian," 30% likely to choose "Chinese," 13% likely to choose "Greek," and 1% likely to choose "French." In an embodiment, the probabilities (408) may be used to weigh the generation of the random seed (4xx) described below.

The candidate tokens (406) are provided as input to a cluster model (410). The cluster model (410) generates one cluster for each of the candidate tokens (406). Thus, in the example, the cluster model (410) will generate four clusters (412). Each one of the clusters (412) considers one of the candidate tokens (406) as a centroid token and generates semantically related tokens that are within a predetermined semantic distance of the centroid token. Thus, for example, the candidate token "Indian" will be the centroid in a cluster of words that are within a predetermined semantic distance of the word "Indian."

In addition, a watermarking key (414) is generated or is provided. The watermarking key (414) is hashed with the clusters (412) to generate a random seed (418). In turn, the watermarking key (414) is used to generate the watermarking data structures (420), which are labeled as "g1," "g2," and "g3" in the example of FIG. 4A. The process for generating the watermarking data structures (420) is described in more detail with respect to FIG. 2. As shown in FIG. 4A, three watermarking data structures (420) are generated, meaning that the value of "m" in equation (3), above, is "3."

Once the watermarking data structures (420) are generated, the tournament sampling process (422) is initiated in order to select the next token from among the candidate tokens (406). Thus, FIG. 4B is a pictorial representation of step 208 of FIG. 2. In the example, FIG. 4B selects Initially, a sample (424) of 2 m tokens is selected from the candidate tokens (406) that the language model (400) is considering to output as the next token. Because m=3 (i.e., there are 3 watermarking data structures), there are 8 tokens randomly selected from the candidate tokens (406). Repeated tokens are possible, as shown. The 8 tokens are as shown in the first tournament round (426) in FIG. 4B. Each of the 8 selected tokens in the first tournament round (426) is assigned a value as determined by the first watermarking data structure (g1). Thus, for example, any instance of the token "French" in the first tournament round (426) is assigned the value of "1," because first watermarking data structure, g1, assigns the value "1" to the token, "French." Thus, the assigned value (428) for "French," is "1" in the first pair of the sample (424). Similarly, the assigned value (430) for "Indian" is also "1" in the first pair of the sample (424) because the candidate token "Indian" is assigned the value of "1" in the first watermarking data structure, g1. For similar reasons, the value of the token "Chinese" is 0 whenever that token appears in the first tournament round (426) and the value of the token "Greek" is also 0 whenever that token appears in the first tournament round (426).

The winner of each pair of tokens in the first tournament round (426) of the tournament sampling process (422) is the token that has the assigned highest value. If both tokens of the pair have the same value, then one of the pair of tokens is randomly assigned to be the winner. Thus, for example, in the first pair of tokens in the sample (424) is "French" and "Indian." The two tokens have the same value, and thus the winning token is randomly selected to be "French." However, the second pair of tokens in the sample (424) is "Chinese" and "Indian." Because the token "Indian" is assigned a value of 1 and the token "Chinese" is assigned a token of 0, the winning token in the second pair of tokens in the sample (424) is the token "Indian."

The process repeats for the third and fourth pairs of tokens in the first tournament round (426). Eventually, the four winning tokens in the first tournament round (426) are paired off against each other as shown. Thus, the first four tokens in the sample (424) are reduced to the first pair of tokens in the second tournament round (432) and the last four tokens in the sample (424) are reduced to the second pair of tokens in the second tournament round (432).

In the second tournament round (432), a similar process occurs. However, in the second tournament round (432), the values assigned to the tokens are assigned according to the second of the watermarking data structures (420), which in the example is watermarking data structure g2. Thus, for example, in the first pair of tokens in the second tournament round (432), the token "French" is assigned a value (434) of 0 and the token "Indian" is assigned a value (436) of 0. As can be seen in the second watermarking data structure, g2, any instance of the token "French" in the second tournament round (432) will be assigned a value of 0, and likewise any instance of the token "Indian" in the second tournament round (432) will be assigned a value of 0.

Again, as with the competition in the first tournament round (426), a competition takes place between the first pair of tokens and between the second pair of tokens in the second tournament round (432). Again, the token assigned a higher value in a pair of tokens is declared the winner. However, if the tokens in a given pair of tokens are assigned the same value, then one of the pair of tokens is randomly determined to be the winner. In the second tournament round (432), the token "Indian" in the first pair of tokens is randomly determined to be the winner. The token "Chinese" in the second pair of tokens of the second tournament round (432) has a higher value than the token "Indian," and thus the token "Chinese" is declared the winner for the second pair of tokens.

The process is repeated in a third tournament round (438). The winning tokens from the second tournament round (432) are paired against each other. However, this time, the values assigned to the tokens are taken according to the third of the watermarking data structures (420), g3. Thus, the value (440) assigned to token "Indian" in the third tournament round (438) is 1, and the value (442) assigned to the token "Chinese" in the third tournament round (438) is 0, as assigned by the watermarking token g3.

The third tournament round (438) competition takes place in a manner similar to that described for the first tournament round (426) and the second tournament round (432). Because the token "Indian" has the higher value in the remaining pair of tokens, the token "Indian" is declared the winner of the third tournament round (438).

The winning token (444) is the last token remaining from the sample (424) after the tournament sampling process (422) is completed. The winning token (444) in the example is the token, "Indian."

The winning token (444) becomes the next token output by the language model (400). Thus, the next token in the number of tokens (402) becomes the token "Indian." Accordingly, the winning token (444) is added to the number of tokens (402) such that the new phrase output by the language model (400) is, "the choice of cuisine is Indian."

The process of generating tokens shown in FIG. 4A and FIG. 4B may be repeated multiple times, once for each new token generated. However, the subset of tokens (404) continues to change to be the most recently generated two tokens. The "sliding window" of tokens that constitutes the most recently generated tokens may be 1 token, 3 tokens, or more tokens. Nevertheless, the process repeats (i.e., adding watermarked tokens at step 210 of FIG. 2) until the language model (400) determines that a stop condition has been satisfied, and thus stops generating new tokens.

The completed set of tokens, once generated, are returned (i.e., at step 212 of FIG. 2). Later, the completed set of tokens, even if modified, may be subjected to the testing process represented by equation 3 as described with respect to FIG. 2. If the completed set of tokens under test have been changed to semantically related tokens, then the statistical test will still reveal that the modified AI text plagiarizes the original AI text.

The reason why the test is robust is because the watermarking data structures (420) used in selecting each winning token output by the language model (400) are generated based on clusters (412) which are semantically related to the candidate tokens (406). Thus, one or more embodiments represent a technical solution the technical problem of how to reliably detect modified AI text.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figure 5A:
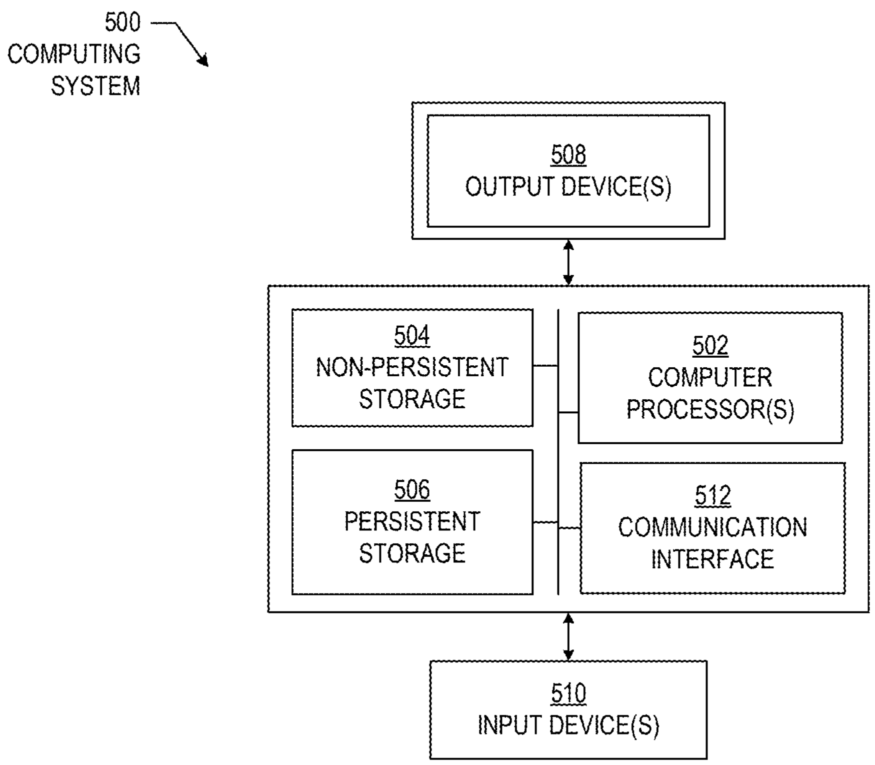
FIG. 5A and FIG. 5B show a computing system and network environment, in accordance with one or more embodiments.

For example, as shown in FIG. 5A, the computing system (500) may include one or more computer processor(s) (502), non-persistent storage device(s) (504), persistent storage device(s) (506), a communication interface (508) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) (502) may be one or more cores, or micro-cores, of a processor. The computer processor(s) (502) includes one or more processors. The computer processor(s) (502) may include a central processing unit (CPU), a graphics processing unit (GPU), a tensor processing unit (TPU), combinations thereof, etc.

The input device(s) (510) may include a touchscreen, keyboard, mouse, microphone, touchpad, electronic pen, or any other type of input device. The input device(s) (510) may receive inputs from a user that are responsive to data and messages presented by the output device(s) (512). The inputs may include text input, audio input, video input, etc., which may be processed and transmitted by the computing system (500) in accordance with one or more embodiments. The communication interface (508) may include an integrated circuit for connecting the computing system (500) to a network (not shown) (e.g., a local area network (LAN), a wide area network (WAN) such as the Internet, mobile network, or any other type of network) or to another device, such as another computing device, and combinations thereof.

Further, the output device(s) (512) may include a display device, a printer, external storage, or any other output device. One or more of the output device(s) (512) may be the same or different from the input device(s) (510). The input device(s) (510) and output device(s) (512) may be locally or remotely connected to the computer processor(s) (502). Many different types of computing systems exist, and the aforementioned input device(s) (510) and output device(s) (512) may take other forms. The output device(s) (512) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (502), is configured to perform one or more embodiments, which may include transmitting, receiving, presenting, and displaying data and messages described in the other figures of the disclosure.

Figure 5B:
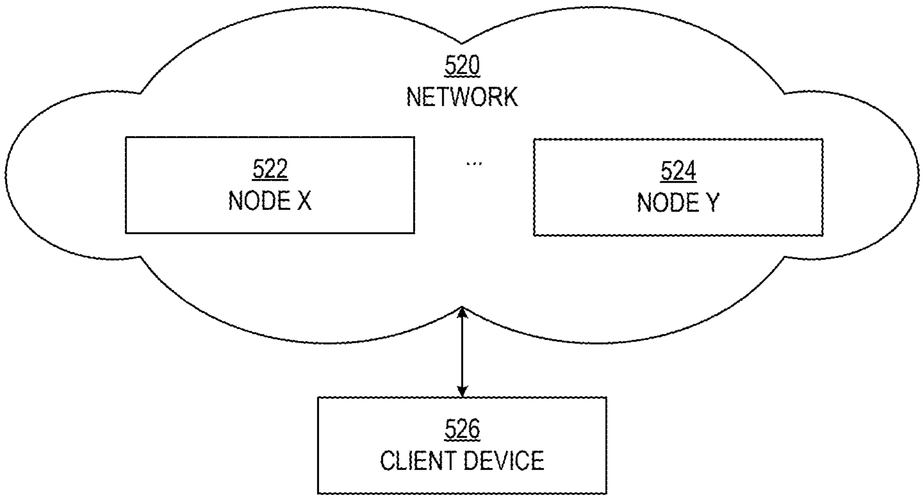

The computing system (500) in FIG. 5A may be connected to, or be a part of, a network. For example, as shown in FIG. 5B, the network (520) may include multiple nodes (e.g., node X (522) and node Y (524), as well as extant intervening nodes between node X (522) and node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522) and node Y (524)) in the network (520) may be configured to provide services for a client device (526). The services may include receiving requests and transmitting responses to the client device (526). For example, the nodes may be part of a cloud computing system. The client device (526) may be a computing system, such as the computing system shown in FIG. 5A. Further, the client device (526) may include or perform all or a portion of one or more embodiments.

The computing system of FIG. 5A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:

processing a language model to generate a plurality of tokens, wherein the plurality of tokens includes a subset of tokens that are newly generated;

processing a clustering model on the subset of tokens to generate a semantic cluster, wherein the semantic cluster comprises a plurality of related tokens that are within a predetermined semantic distance of the subset of tokens;

generating a seed;

generating, from a combination of the seed and the semantic cluster, a watermarking data structure, wherein the watermarking data structure stores a series of numbers representing scores assigned to candidate tokens under consideration by the language model during text generation;

generating, by a sampling process using the watermarking data structure, a watermarked token after the plurality of tokens such that the watermarked token is generated after generation of the subset of tokens and such that the watermarked token is appended to the subset of tokens;

adding the watermarked token to the plurality of tokens to generate output tokens; and returning the output tokens.

2. The method of claim 1, wherein the output tokens comprise artificial intelligence (AI) text, and wherein the method further comprises:

receiving modified AI text comprising the AI text after a token in the AI text has been modified, deleted, or added;

combining the modified AI text with the watermarking data structure to generate a score;

determining that the score exceeds a threshold value; and identifying, responsive to the score exceeding the threshold value, that the modified AI text comprises a variation of the AI text.

3. The method of claim 2, wherein:
the modified AI text comprises a cluster token,
the cluster token is present within the modified AI text and belongs to the semantic cluster, and
the watermarking data structure is associated with the semantic cluster by combining the seed with the semantic cluster.

4. The method of claim 1, further comprising:
generating the seed from the semantic cluster.

5. The method of claim 1,
wherein the plurality of tokens comprises a plurality of subsets of tokens, in addition to the subset of tokens, and
wherein the method further comprises:
processing the clustering model on the plurality of subsets of tokens to generate a plurality of semantic clusters,
wherein the plurality of semantic clusters each comprises sets of related tokens, from among the plurality of tokens, that are within a predetermined semantic distance of centroid tokens in the plurality of semantic clusters, and
the sets of related tokens are within corresponding ones of the plurality of subsets of tokens;
generating, from a combination of the seed and the plurality of semantic clusters, a corresponding plurality of watermarking data structures for each of the plurality of semantic clusters;
generating, by the sampling process, a plurality of additional watermarked tokens after the plurality of tokens and after the watermarked token;
adding the plurality of additional watermarked tokens to the plurality of tokens to generate new output tokens; and
returning the new output tokens.

6. The method of claim 5,
wherein the new output tokens comprise new artificial intelligence (AI) text, and
wherein the method further comprises:
receiving new modified AI text comprising the new AI text after a token in the new AI text has been modified, deleted, or added;
combining the new modified AI text with the corresponding plurality of watermarking data structures to generate a modified score;
determining the modified score exceeds a threshold value; and
identifying, responsive to the modified score exceeding the threshold value, the new modified AI text as being a second variation of the AI text.

7. The method of claim 5, further comprising:
generating the seed from a most recent set of the plurality of the semantic clusters, wherein the most recent set comprises at least one of the plurality of semantic clusters that was most recently generated in time.

8. The method of claim 5,
wherein each of the corresponding plurality of watermarking data structures is associated with a corresponding set of potential next tokens, and
wherein, together, the plurality of watermarking data structures is associated, on a one-for-one basis, with a plurality of sets of potential next tokens,
wherein the language model generates the plurality of sets of potential next tokens using the plurality of watermarking data structures.

9. The method of claim 8, wherein each of the plurality of tokens is selected from a corresponding one of the different set of corresponding potential next tokens.

10. The method of claim 1, wherein the sampling process comprises a tournament sampling process.

11. A system comprising:
a computer processor;
a data repository in communication with the computer processor and storing:
a plurality of tokens, wherein the plurality of tokens includes a subset of tokens that are newly generated,
a semantic cluster, wherein the semantic cluster comprises a plurality of related tokens that are within a predetermined semantic distance of the subset of tokens,
a seed,
a watermarking data structure, wherein the watermarking data structure stores a series of numbers representing scores assigned to candidate tokens under consideration by the language model during text generation,
a watermarked token, and
output tokens;
a language model executable by the computer processor to generate the plurality of tokens;
a clustering model executable by the computer processor to generate the semantic cluster; and
a server controller executable by the computer processor to:
generate, from a combination of the seed and the semantic cluster, the watermarking data structure,
generate, by a sampling process using the watermarking data structure, the watermarked token after the plurality of tokens such that the watermarked token is generated after generation of the subset of tokens and such that the watermarked token is appended to the subset of tokens,
add the watermarked token to the plurality of tokens to generate the output tokens, and
return the output tokens.

12. The system of claim 11,
wherein the output tokens comprise artificial intelligence (AI) text, and
wherein the server controller is further programmed to:
receive modified AI text comprising the AI text after a token in the AI text has been modified, deleted, or added;
combine the modified AI text with the watermarking data structure to generate a score;
determine that the score exceeds a threshold value; and
identify, responsive to the score exceeding the threshold value, that the modified AI text comprises a variation of the AI text.

13. The system of claim 12, wherein:
the modified AI text comprises a cluster token,
the cluster token is present within the modified AI text and belongs to the semantic cluster, and
the watermarking data structure is associated with the semantic cluster by combining the seed with the semantic cluster.

14. The system of claim 11, wherein the server controller is further programmed to:
generate the seed from the semantic cluster.

15. The system of claim 11,
wherein the plurality of tokens comprises a plurality of subsets of tokens, in addition to the subset of tokens, and
wherein the server controller is further programmed to:
process the clustering model on the plurality of subsets of tokens to generate a plurality of semantic clusters, wherein the plurality of semantic clusters each comprises sets of related tokens, from among the plurality of tokens, that are within a predetermined semantic distance of centroid tokens in the plurality of semantic clusters, and wherein the sets of related tokens are within corresponding ones of the plurality of subsets of tokens;

generate, from a combination of the seed and the plurality of semantic clusters, a corresponding plurality of watermarking data structures for each of the plurality of semantic clusters;

generate, by the sampling process, a plurality of additional watermarked tokens after the plurality of tokens and after the watermarked token;

add the plurality of additional watermarked tokens to the plurality of tokens to generate new output tokens; and return the new output tokens.

16. The system of claim 15, wherein the new output tokens comprise new artificial intelligence (AI) text, and wherein the server controller is further programmed to:

receive new modified AI text comprising the new AI text after a token in the new AI text has been modified, deleted, or added;

combine the new modified AI text with the corresponding plurality of watermarking data structures to generate a modified score;

determine the modified score exceeds a threshold value; and identify, responsive to the modified score exceeding the threshold value, the new modified AI text as being a second variation of the AI text.

17. The system of claim 15, wherein the server controller is further programmed to:

generate the seed from a most recent set of the plurality of the semantic clusters, wherein the most recent set comprises at least one of the plurality of semantic clusters that was most recently generated in time.

18. The system of claim 15, wherein each of the corresponding plurality of watermarking data structures is associated with a corresponding set of potential next tokens, and wherein, together, the plurality of watermarking data structures is associated, on a one-for-one basis, with a plurality of sets of potential next tokens, wherein the language model generates the plurality of sets of potential next tokens using the plurality of watermarking data structures.

19. The system of claim 18, wherein:

each of the plurality of tokens is selected from a corresponding one of the different set of corresponding potential next tokens, and the sampling process comprises a tournament sampling process.

20. A method comprising:

processing a language model to generate a plurality of tokens, wherein the plurality of tokens includes a subset of tokens that are newly generated;

processing a clustering model on the subset of tokens to generate a semantic cluster, wherein the semantic cluster comprises, from among the plurality of tokens, a plurality of related tokens that are within a predetermined semantic distance of a centroid token;

generating a seed from the semantic cluster;

generating, from a combination of the seed and the semantic cluster, a watermarking data structure, wherein the watermarking data structure is associated with the semantic cluster by combining the seed with the semantic cluster, and wherein the watermarking data structure stores a series of numbers that represent scores assigned to candidate tokens under consideration by the language model during text generation;

generating, by a tournament sampling process using the watermarking data structure, a watermarked token after the plurality of tokens;

adding the watermarked token to the plurality of tokens to generate output tokens such that the watermarked token is generated after generation of the subset of tokens and such that the watermarked token is appended to the subset of tokens;

returning the output tokens, wherein the output tokens comprise artificial intelligence (AI) text;

receiving modified AI text comprising the AI text after a token in the AI text has been modified, deleted, or added, and further comprising a cluster token, and wherein the cluster token is present within the modified AI text and belongs to the semantic cluster;

combining the modified AI text with the watermarking data structure to generate a score;

determining that the score exceeds a threshold value; and identifying, responsive to the score exceeding the threshold value, that the modified AI text comprises a variation of the AI text.

* * * * *